(12) United States Patent
Choate (10) Patent No.: US 6,551,041 B2
(45) Date of Patent: *Apr. 22, 2003

(54) QUICK CONNECT/DISCONNECT FALL ARREST ANCHORAGE WITH PERMANENT CONNECTORS

(76) Inventor: Gary E. Choate, 1675 Carr St., #101N, Lakewood, CO (US) 80215

( * ) Notice: Subject to any disclaimer, the term of this patent is extended or adjusted under 35 U.S.C. 154(b) by 0 days.

This patent is subject to a terminal disclaimer.

(21) Appl. No.: 09/954,578

(22) Filed: Sep. 12, 2001

(65) Prior Publication Data

US 2002/0071738 A1 Jun. 13, 2002

Related U.S. Application Data (60) Provisional application No. 60/232,279, filed on Sep. 13, 2000.

(51) Int. Cl.$^7$ .............................. F16B 2/00; A41F 1/00
(52) U.S. Cl. ....................... 411/348; 411/400; 411/510; 24/453; 403/409.1
(58) Field of Search ................................ 411/347, 348, 411/508, 509, 510, 400; 24/297, 453; 403/409.1

(56) References Cited

U.S. PATENT DOCUMENTS

| | | | | |
|---|---|---|---|---|
| 2,399,581 A | * | 4/1946 | Spooner | 24/453 |
| 3,085,462 A | * | 4/1963 | Myers | 24/453 |
| 3,106,416 A | * | 10/1963 | Koontz | 24/453 |
| 4,988,248 A | | 1/1991 | Flux | |
| 5,232,302 A | * | 8/1993 | Wagner et al. | 411/510 X |
| 5,340,255 A | | 8/1994 | Duran | |

* cited by examiner

Primary Examiner—Neill Wilson
(74) Attorney, Agent, or Firm—Ramon L. Pizarro; Edwin H. Crabtree (57) ABSTRACT

An anchorage device that includes a receiver having a body having an aperture along an axis, the aperture having a first section of a first size and a second section of a second size, the second size being smaller than the first size, the first section having a first retaining recess, and the second section having a second retaining recess. The receiver cooperates with a male connector adapted for insertion into the aperture of the receiver, the male connector includes a set of parallel retractable retaining mechanisms located along the male connector. The system provides for engagement of at least two of the retractable mechanisms against the receiver.

9 Claims, 14 Drawing Sheets

WELD ON 92

CLAMP ON 94

QUICK CONNECT/DISCONNECT FALL ARREST ANCHORAGE WITH PERMANENT CONNECTORS

REFERENCE TO RELATED APPLICATIONS

This application claims the benefit of my provisional application having serial No. 60/232,279, filed Sep. 13, 2000, now abandoned. Additionally, attention is drawn to my co-pending application Ser. No. 09/837,967, filed Apr. 18, 2001.

BACKGROUND OF THE INVENTION

1. Field of Invention

The present invention relates to a method for quick connection of a fall arrest anchorage connector to an anchorage. Additionally, the invention relates to a method of providing anchorages that can be pre-cast into concrete structures or attached with a variety of clamps or welding. Additionally this patent relates to anchorage connectors that can be installed and removed remotely and are self indicating if it has been improperly or insufficiently locked into its receiver. Additionally this connector can be used to connect horizontal lifelines to anchorages, install barriers, tie down loads in aircraft and ships and secure aircraft or watercraft to docking ports.

2. Known Art

Remote connect anchorage products are currently used in many applications for fall arrest, rescue, and evacuation situations. Connectors come in a variety of types such as those that are used to open and close locking snap hooks, those that are used to remotely attach to beams and those that connect to remotely attached D-rings. All of these remote connectors can work from extension poles for remotely connecting anchorages or remotely attaching to fallen or disabled workers for rescue. In each case the remote connect/disconnect tool is specifically designed to work with the specified anchorage connector. In each case these remote connectors are made to work with previously installed anchorages, such as D-rings installed overhead or on harnesses, or beam flanges, etc. No system has previously been designed to enable remote connection to concrete structures. This invention relates to, but is not limited to, a method for remote fall protection anchorage connection to poured-in-place concrete structures.

Currently fall protection for workers doing poured in place concrete work is limited to attachment to rebar or concrete forms. When rebar is being erected workers typically tie off to the rebar as it is being erected. When the concrete forms are installed over the rebar, the workers tie off to the concrete forms for fall protection. The problem occurs when the workers are removing the concrete forms. As the forms are removed from the top down, the tie off locations that were once above the worker disappear and the workers only choice is to tie off at his feet unless some other overhead structure exists. In case of a fall this situation creates a 12-ft. free-fall and introduces greater possibility of injury. OSHA requires that systems must be rigged so that a worker will encounter no more than 6-ft. of free-fall. A system has been needed for some time that will solve this problem and enable workers and companies to come into compliance with OSHA requirements. This present invention relates to a method of embedding receivers in concrete form-work with attachment to internal rebar for added pullout strength so that as concrete forms are removed fall arrest anchorage receivers are exposed in the surface of the freshly poured concrete. This will allow the workers to always be attached overhead so that incase of a fall their free-fall is always limited to 6-ft. maximum. Another problem area for concrete work is perimeter fall protection of newly poured floors. OSHA requires that anyone within six feet of the leading edge must have fall protection or there must be a perimeter guardrail. Some work such as glazing requires that the perimeter guardrail be removed. By installing the anchorage receivers in the forms at a distance of six feet from the leading edges and at intervals of approximately eight feet in running length fall arrest attachment points can be installed in the ceiling to provide perimeter fall protection without the need for perimeter guardrails. This receiver can also be used on rooftops or for window washers and in elevator shafts for repairmen. It is also designed for quick connect/disconnect of Horizontal Lifelines. Other uses can be for aircraft tie-downs, boat docks or other applications where high strength flush mounting of anchorages in concrete is required.

SUMMARY

The present invention relates to an improved method of installing fall protection anchorages in poured in place concrete that will enable workers to remotely connect and disconnect from their anchorage location. It provides for anchorages that can be flush mounted to walls, roofs, elevator shafts, runways, docks, and other locations that will enable a fall arrest attachment point to always be located above the worker even after forms and scaffolding have been removed. It provides for 5,000-lbs. fall protection for personal fall arrest systems and for 12,000-lbs. anchorages for Horizontal Lifelines. It allows for poured in place anchorage receivers as well as weld-on or clamp on receivers. The present invention allows for anchorage connectors that are light weight, easy to connect and disconnect remotely and have 2 degrees of freedom, (they can both rotate and swivel) to reduce the possibility of rollout with locking and non-locking snap hooks. They can be attached to twin lanyards and moved from workstation to workstation with the user.

The present invention also allows for anchorage connectors that are intended to be installed in the receivers permanently. These connectors use a through bolt installed after the connector is inserted into the receiver. The bolt makes it impossible to separate the connector from the receiver until the bolt is removed. These connectors come in both solid ring and bypass ring styles. The bypass ring is used for HLL application to enable bypassing the anchorage without requiring the worker to disconnect. The solid ring style permanent anchorage connector may be used as an individual permanent fall arrest anchor or as a bypass support for horizontal lifelines.

The method can be used with:

a. A pour in place anchorage receiver for concrete construction.

b. A weld-on or clamp on anchorage receiver for steel erection or in plant use.

c. An anchorage connector that can be connected and disconnects remotely.

d. An anchorage connector that has 2 degrees of freedom to rotate and swivel.

e. An anchorage connector that can be locked into place or removed by a single pushing motion.

f. An anchorage connector that locks using a ball groove mechanism.

g. An anchorage connector that is self-indicating and will push itself out of the receiver if a full lock is not achieved.

h. An anchorage connector that uses 2 or more rows of locking balls and different diameters so that each row of balls can lock only in its designated groove thus assuring that all balls must lock securely for the mechanism to be used.

i. A permanent anchorage connector that may be installed in the receiver and bolted so that it cannot be removed without first removing the bolt. It locks into the ball grooves in the receivers, but does not use locking balls.

j. A permanent anchorage connector that can be used as a manual bypass for horizontal lifeline systems.

k. An improved material and method for manufacturing surface finishing and heat-treating the components.

l. A method for use allowing shock absorbing elements to be attached to the anchorage connector.

m. Special adapters to hold and position the anchorage receiver during installation in floors, ceilings, walls, etc.

In another aspect, this invention relates to the self-indicating fail-safe locking mechanism of the anchorage connector. By pushing in on the center pin of the connector, the ball lock is released and the balls are allowed to move toward the center of the connector thus allowing the connector to be inserted fully into the receiver. The outside diameter of the first row of balls is smaller than the inside diameter of the receiver entry. This assures that the first row of balls in the connector cannot lock into the first ball groove in the receiver. Therefore, for the connector to lock into the receiver each row of balls must be in its designated groove, thus assuring that all balls are sharing an equal load. Should the receiver be damaged and even one of the balls is unable to seat completely in the ball groove, that ball will keep the locking plunger from being able to move underneath any of the balls to lock them into place. In such a case the ejection spring on the end of the connector will push the connector out of the receiver showing that a problem has occurred, that the connector did not properly lock and that this particular receiver should not be used.

In another aspect the manufacturing materials and processes used to produce this product enable it to withstand the severe environment in which it must operate.

Extreme hardness of the surface is required due to its use in an abrasive concrete dust and rock environment. At the same time the surface must be extremely tough, but not brittle, so that it can withstand the shock loads imposed by fall arrest forces. To achieve this combination of toughness and extreme surface hardness a special process has been developed. The material chosen for the receiver is 17-4 PH stainless steel. It is machined in its annealed state at approximately 28 Rc hardness. Once machined, it is polished and then coated with titanium nitride. The nitriding process includeded a 3 hour bake at 700 degrees F., which is the heat treat temperature of 17-4 PH stainless steel. The result of this process is that the 17-4 PH stainless steel is hardened to 40 Rc in its core (which is below the 42 Rc crossover range into brittleness) and yet it is 80 Rc on the surface which is the hardness of titanium nitride. The result is the perfect combination of properties. The receiver is made of corrosion resistant stainless steel (to resist rust in a wet environment), hardened to 40 Rc in its core (which gives it the greatest strength without brittleness) and it is 80 Rc on the surface (which is harder than a file) to give it extreme wear resistance in the highly abrasive environment in which it must operate.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

FIGS. 1 through 7 illustrates the quick connect/disconnect fall arrest anchorage receiver and connector geometry, use and assembly according to the preferred embodiment of this invention.

Figure 8:
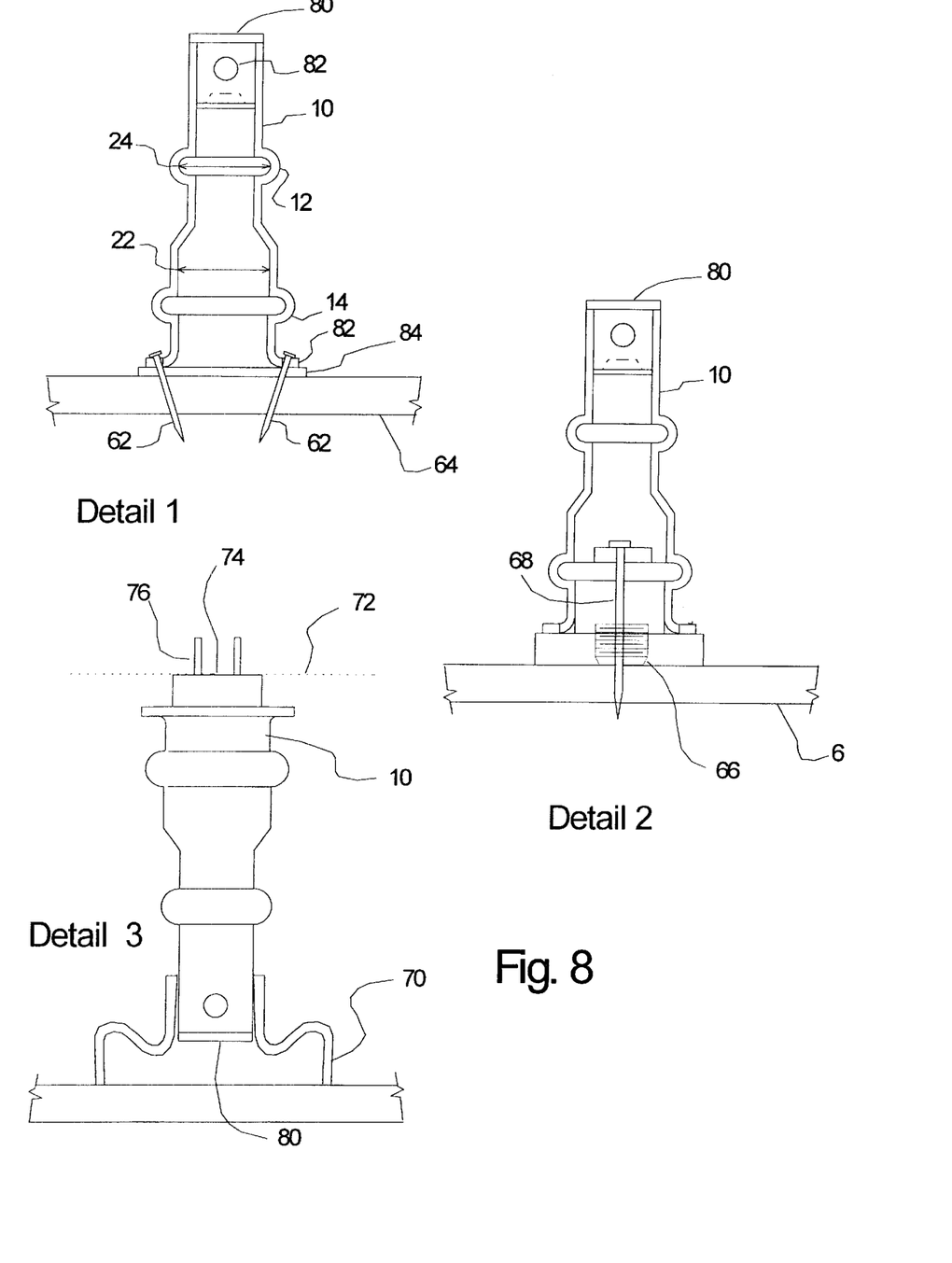
FIG. 8 shows mounting configurations.

FIG. 8 shows mounting configuration. FIGS. 9 through 14 shows the permanent anchorage connector and permanent bypass anchorage connector used for horizontal lifeline systems.

Figure 1:
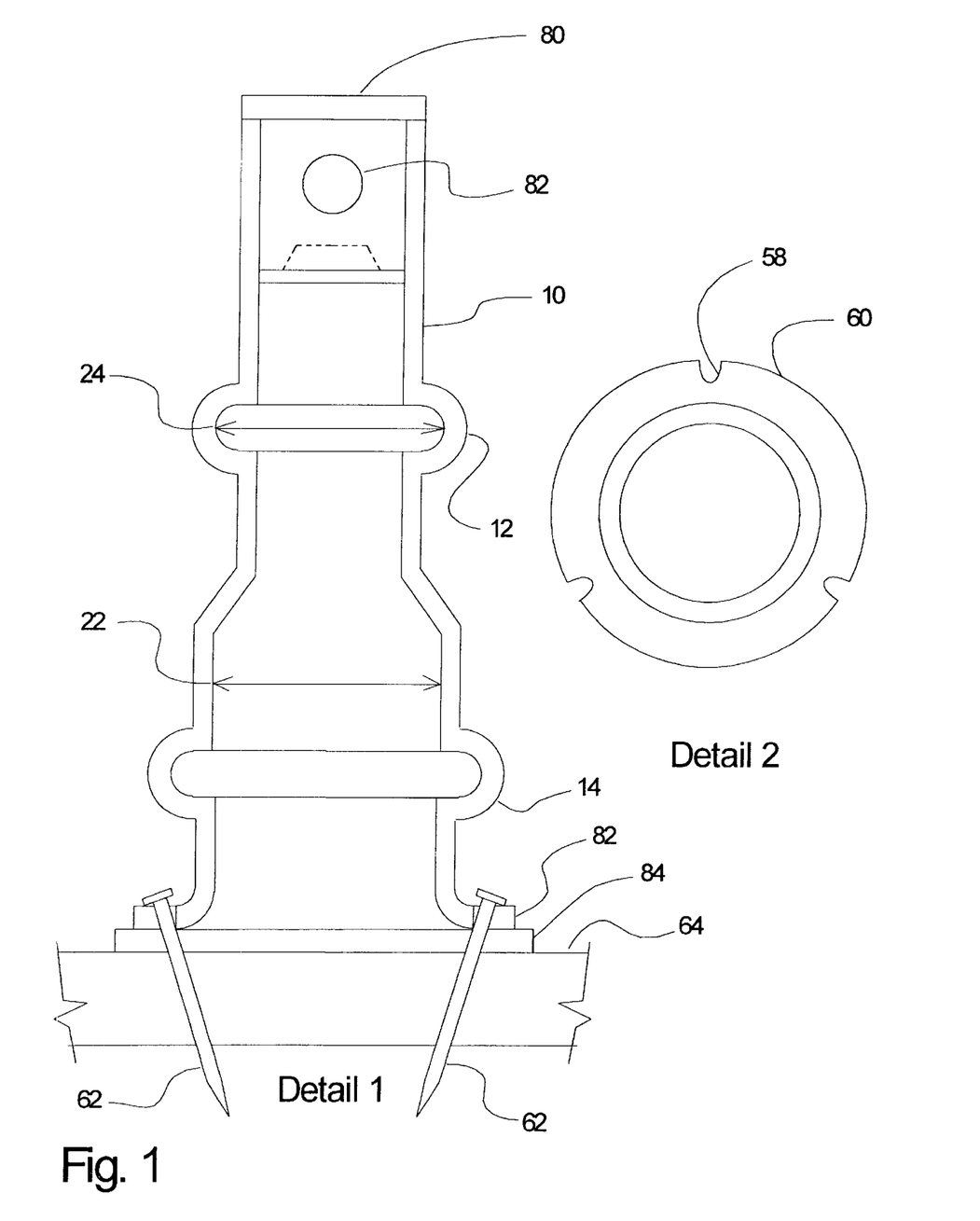
FIG. 1 is a detail of the concrete embed receiver.
Figure 2:
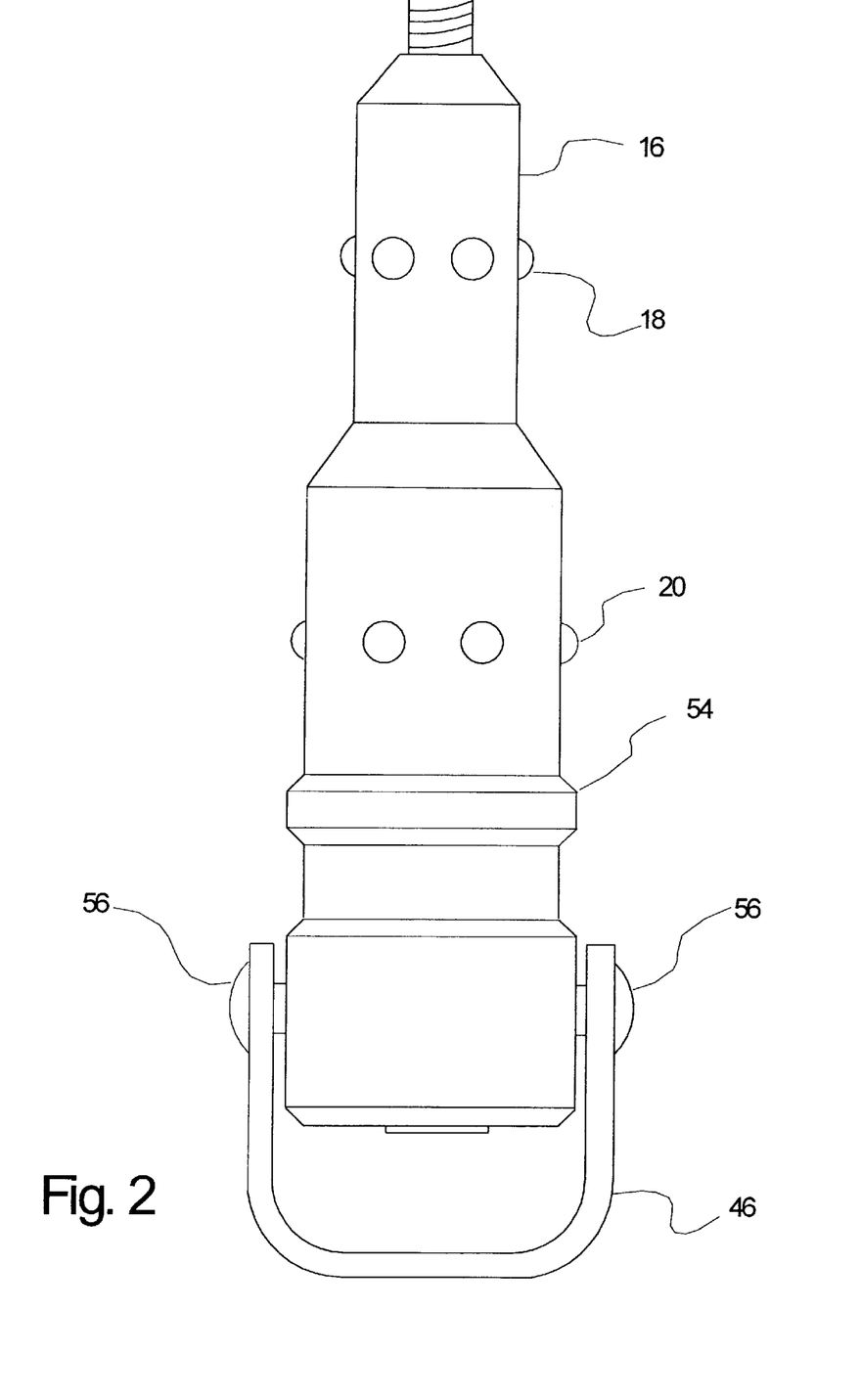
FIG. 2 is a connector detail.
Figure 3:
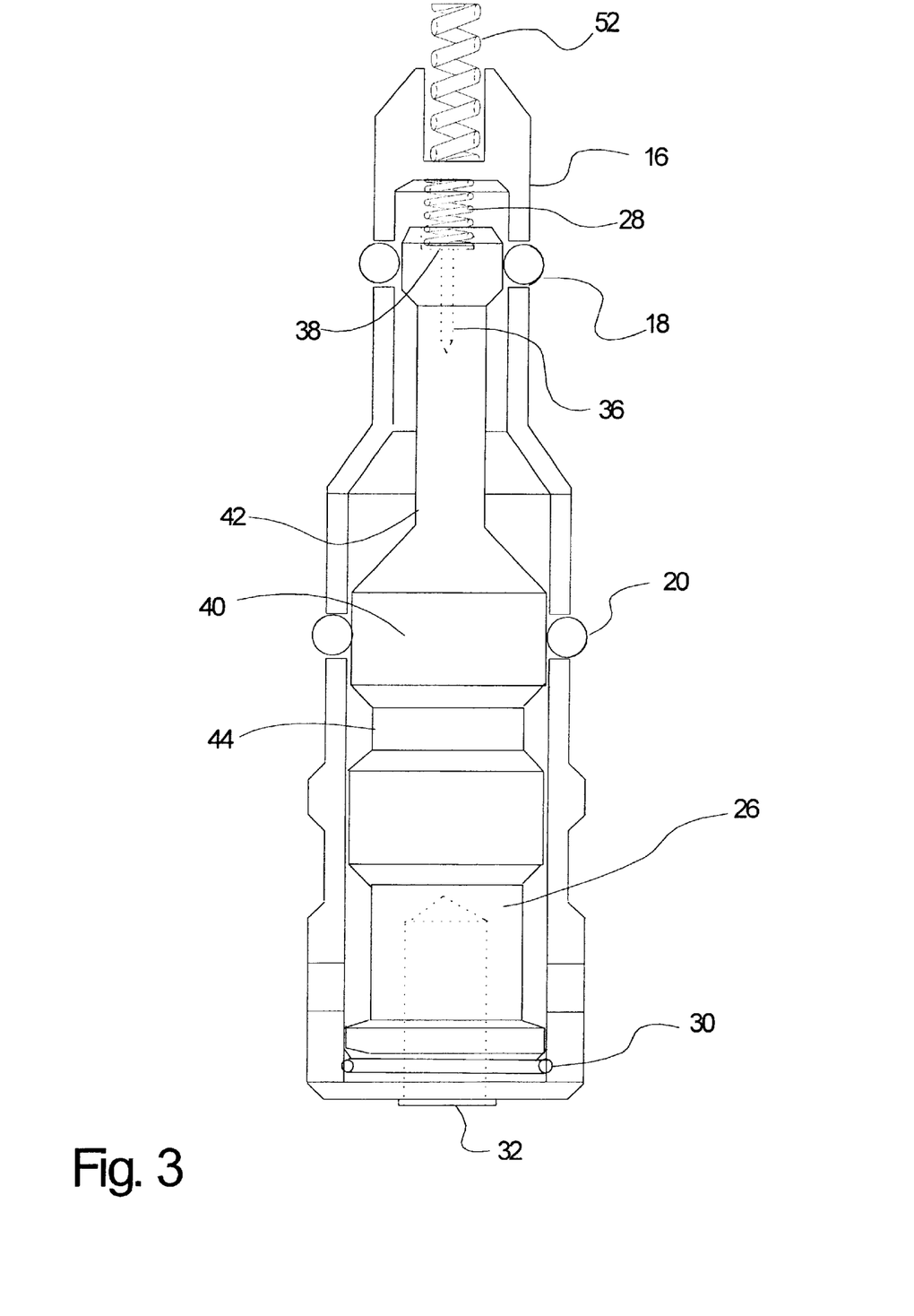
FIG. 3 is a connector sectional view.
Figure 4:
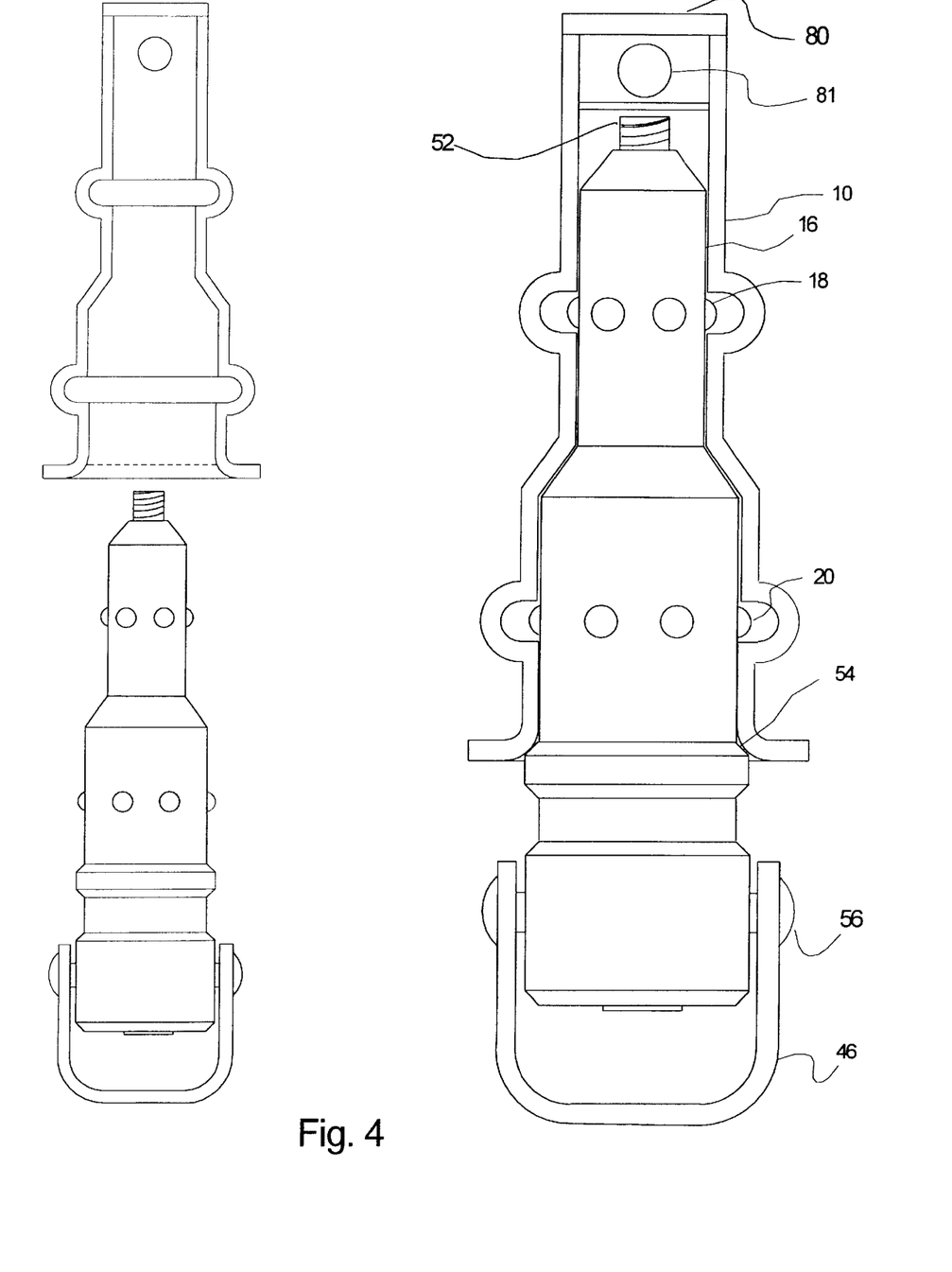
FIG. 4 is a view of the connector attached to the receiver.
Figure 5:
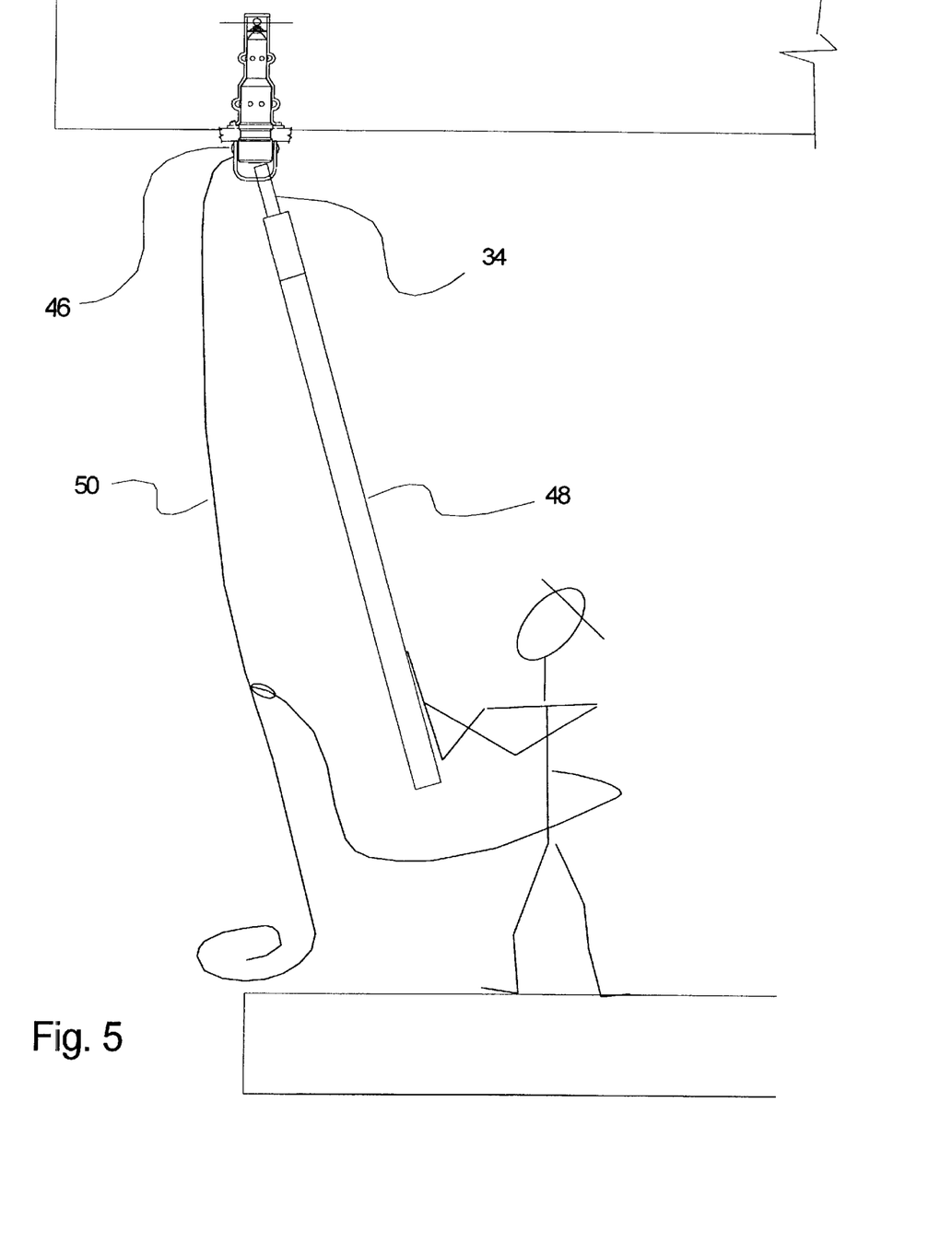
FIG. 5 is a detail of the remote connection/disconnection pole and use.

Referring to FIG. 1, Detail 1, the concrete embed receiver (10) is shown in sectional view. The receiver is made of steel or stainless steel and is formed to contain at least 2 or more separate ball grooves (12) and (14) in which the balls (18) and (20) in the receiver (16) lock when connected. The outside diameter of the ball groove (24) must be smaller than the inside diameter of the receiver at (22). This assures that when the connector (16) is inserted into the receiver (10) that the first row of balls (18) cannot lock into the first ball groove (14). This assures that the connector (16) must be fully inserted fully into the receiver (10) for any of the balls (18) and (20) to lock (see FIG. 4). This assures that all balls must share an equal load. In the preferred embodiment, there will be at least 6 balls in each row (18) and (20), but may be more or less. FIG. 3 is a sectional view showing the inner mechanism of the connector. The center of the connector body (16) contains a spring-loaded plunger (26) and a return pressure spring (28). The plunger (26) is retained in the connector body (16) by a retaining ring (3). The plunger (26) has a first hollow end (32) used to insert a screwdriver tip or remote pole tip (34) (FIG. 5). The plunger (26) also has a second hollow end (36) used to allow air pressure to be relieved as the plunger (26) moves forward in the connector body (16). As the plunger (26) moves forward in the connector body (16) its movement is resisted by the pressure spring (28). As the plunger compresses the pressure spring (28) the retaining surfaces (38) and (40) which hold the balls (18) and 20) in their locked position move forward and allow the recess grooves (42) and (44) to move under the locking balls (18) and (20). This movement allows the balls to move inward into the connector (16) and release their lock against the ball grooves (12) and (14) in the receiver (10). By pulling on the load ring (46) while the plunger pressure spring (28) is compressed, the connector can be removed from the receiver (16). This can be done remotely as shown in FIG. 5, by pushing up on the remote connect pole (48) and at the same time pulling down on the fall block or tag line rope (50), the connector (16) can be removed remotely. The connector (16) is installed remotely by inserting it on the top of the remote connect pole (48) and simply pushing. When the pushing force overcomes the force of the pressure spring (28) the connector (16) will snap into place in the receiver (10).

To enable the connector to be self-indicating if a lock has not been achieved, a second ejector spring (52) is installed in the end of the connector (16). The pressure spring (28) is stronger than the ejector spring (52). When the pressure spring (28) is compressed allowing the connector (16) to snap into place in the receiver (10) the force of the pressure spring (28) holds the ejector spring (52) in its compressed position. As the installation force used to compress the pressure spring (28) is released, this allows the plunger (26) to return to its locked position. If any damage has occurred to the receiver (such as a damaged or plugged ball groove) that will not allow even one ball to move outward form the body of the receiver (16), the plunger (26) is unable to return to its locked position. The ejector spring (52) will then push the connector (16) out of the locking position (as shown if FIG. 4) thus making it impossible for the balls (18) and (20) to create a partial lock in the grooves (12) and (14). A slight pull then by the worker will remove the connector showing that it cannot be used for its intended purpose.

Since the connector (16) can be installed in receivers (10) that are positioned horizontally as well as vertically the tolerance between the connector and receiver must be liberal enough to allow the connector (16) to rotate freely in the receiver (10). After the balls (18) and (20) have locked securely in the ball grooves (12) and (14), the load ring (46) must also be able to rotate freely from side to side about the axis sleeves (56). This freedom of movement assures that a fall arrest load applied at right angles to the axis of the receiver can be controlled properly. This also reduces the possibility of rollout if used with non-locking snap-hooks. In a horizontally installed position the connector (16) is designed to rest against the receiver (10) at a peripheral location (54) (FIG. 4). This removes the side load from the balls (20) and reduces the bending moments on the connector (16).

Mounting of the receivers (10) into concrete forms are accomplished by several means. FIG. 8 shows receivers mounted using nails to attach the receiver (10) to a plywood form (Detail 1), mounting using a plastic mounting plug (Detail 2) and mounting using a wire suspension form (Detail 3). The receiver (10) has 3notches (58) in the perimeter of its base (60) that allow nails to be inserted through. Because these are notches (58), not holes, the nails (62) can be fully removed by bending them sideways after the concrete form (64) has been removed. Detail 2, FIG. 8 shows a receiver (10) that is snapped over a plastic mounting plug (66). The plastic mounting plug (6) can be installed with one center nail (68) by driving it through the center of the mounting plug (66). The mounting plug (66) then pops out when the form (14) is removed. Detail 3 shows a wire suspension form (70) used to support the receiver (10) when installing it in a form in which it will be exposed on the top surface of the concrete (72) such as for roof applications. In this position a pressure plug (74) is installed in the receiver (10) to keep concrete from entering the receiver during pouring of the concrete. Locating fingers (76) are part of the pressure plug (74 to enable the receiver to be located after the concrete is poured.

In normal installations a top pressure plug (80 is always installed in the top of the receiver (10) to keep concrete out of the receiver. A bottom pressure washer (82) with sealing foam (84) is used to prevent concrete from entering the bottom of the receiver (10) during installation. The pressure of the installation nails (62) assures a tight fit against the concrete form (64).

Figure 6:
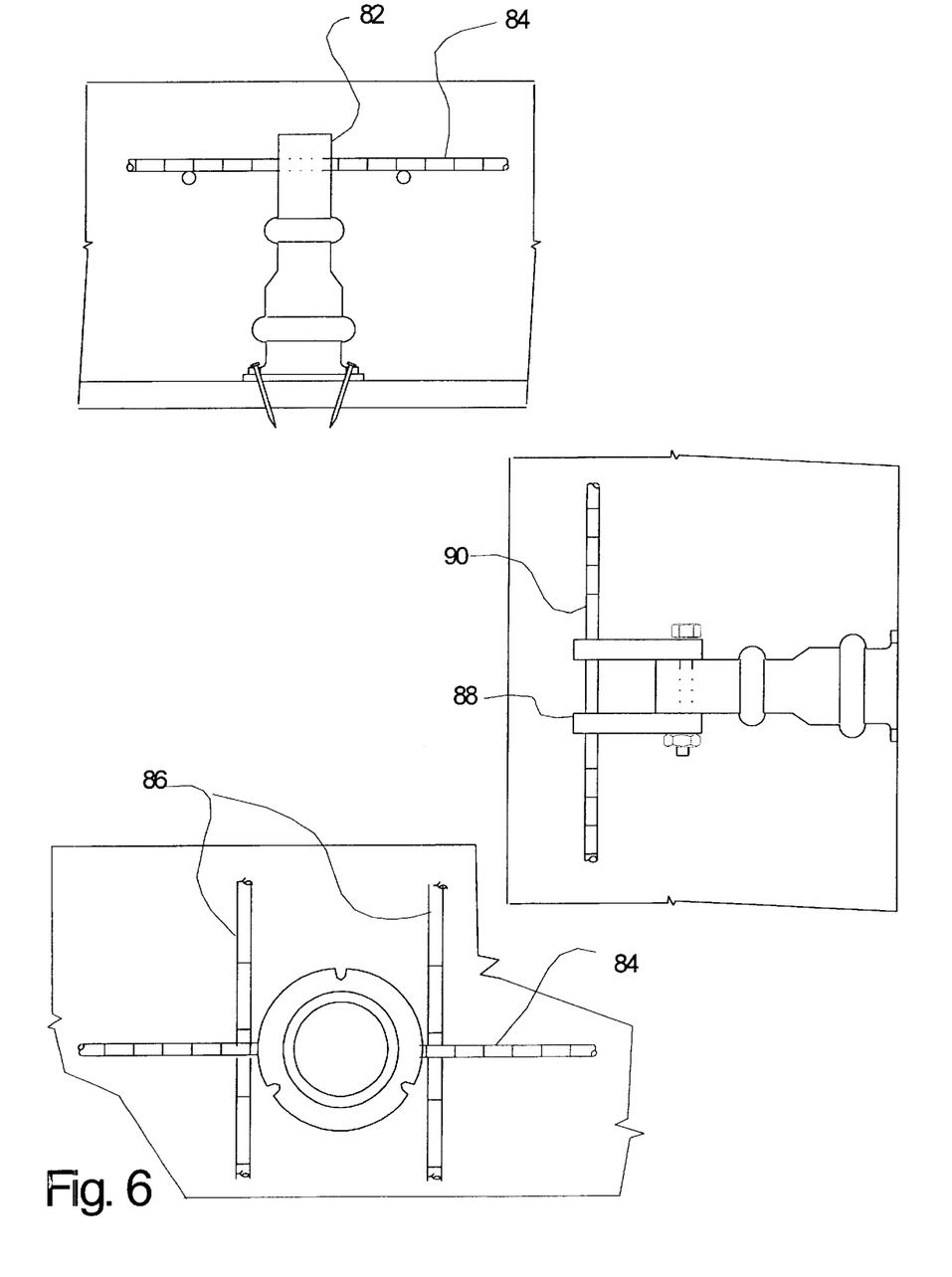
FIG. 6 is a detail of embed receivers in concrete showing rebar connections.
Figure 7:
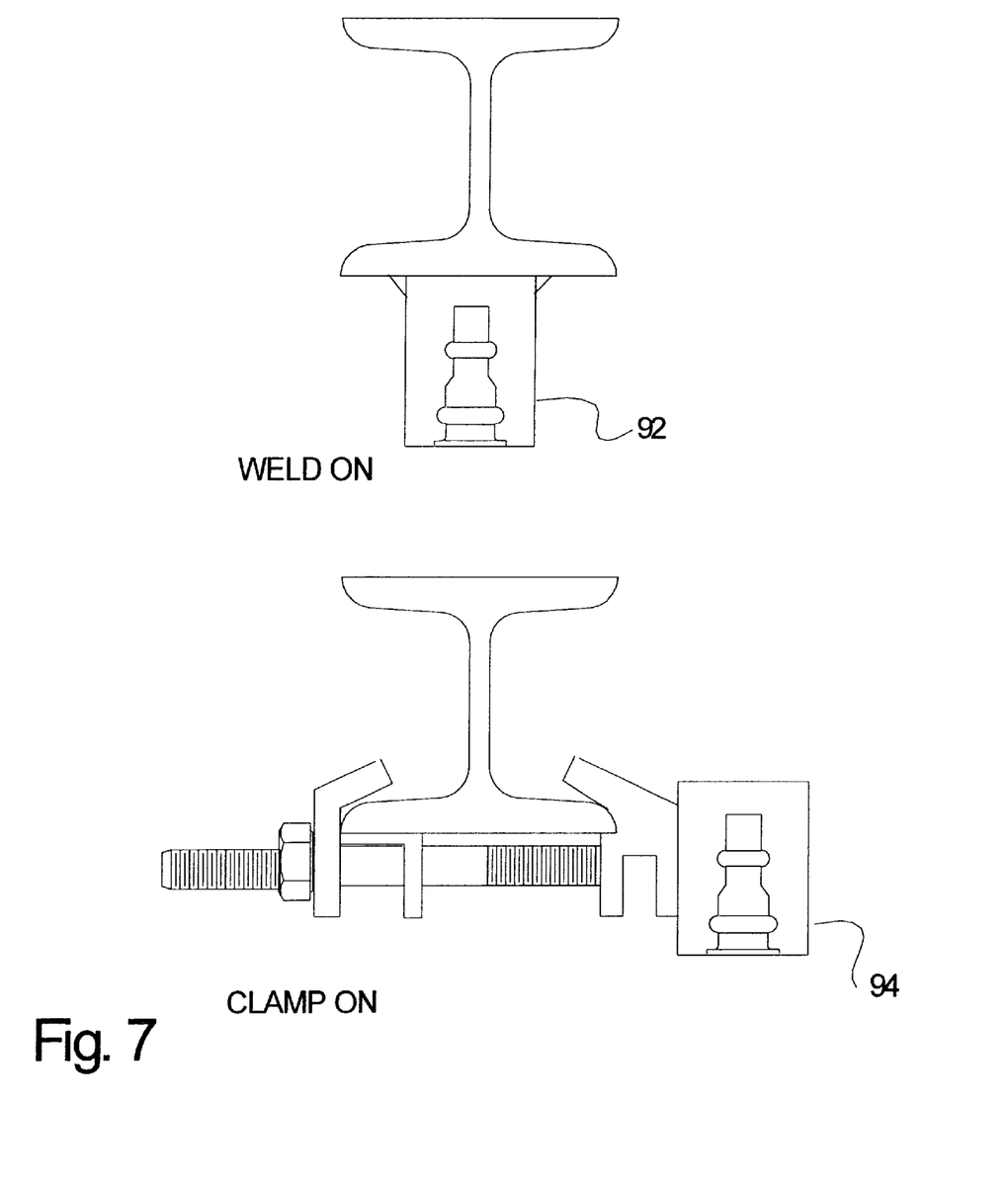
FIG. 7 is a detail showing receivers attached to rigid structure other than concrete.

The receiver (10) is produced with a cross hole (81) in the top of the receiver (10) which is used to insert a section of rebar (84) as shown in FIG. 6. Cross rebar (86) may also be added for additional support. In some cases special brackets (88) may be added to enable support to be made to larger rebar (90) or to rebar embedded deeper into the concrete. The design of the receiver though is not limited to pour-in-place concrete applications. FIG. 7 shows a weld-on receiver (92) and a clamp-on receiver (94), of which there are an infinite variety and styles.

The ball lock anchorage connector (16) used in this design is made as a quick connect/disconnect anchorage so that it may be attached to a shock-absorbing lanyard and used as personal fall protection equipment during construction of a building. Once the construction is complete, the receivers are left in place and can be used for future maintenance or facilities support. For this reason a low-cost permanent anchorage connector can be used for creating permanent fall arrest anchorage supports at the location of each poured-in-place concrete embed receiver. Since these connectors are used only for permanent fall arrest or facilities support, they do not need the full strength of the 12 locking balls of the ball lock anchorage connector. These permanent connectors need only 5,000-lb. of strength so only 4 locking surfaces are required to support the load but may use more if needed.

Figure 9:
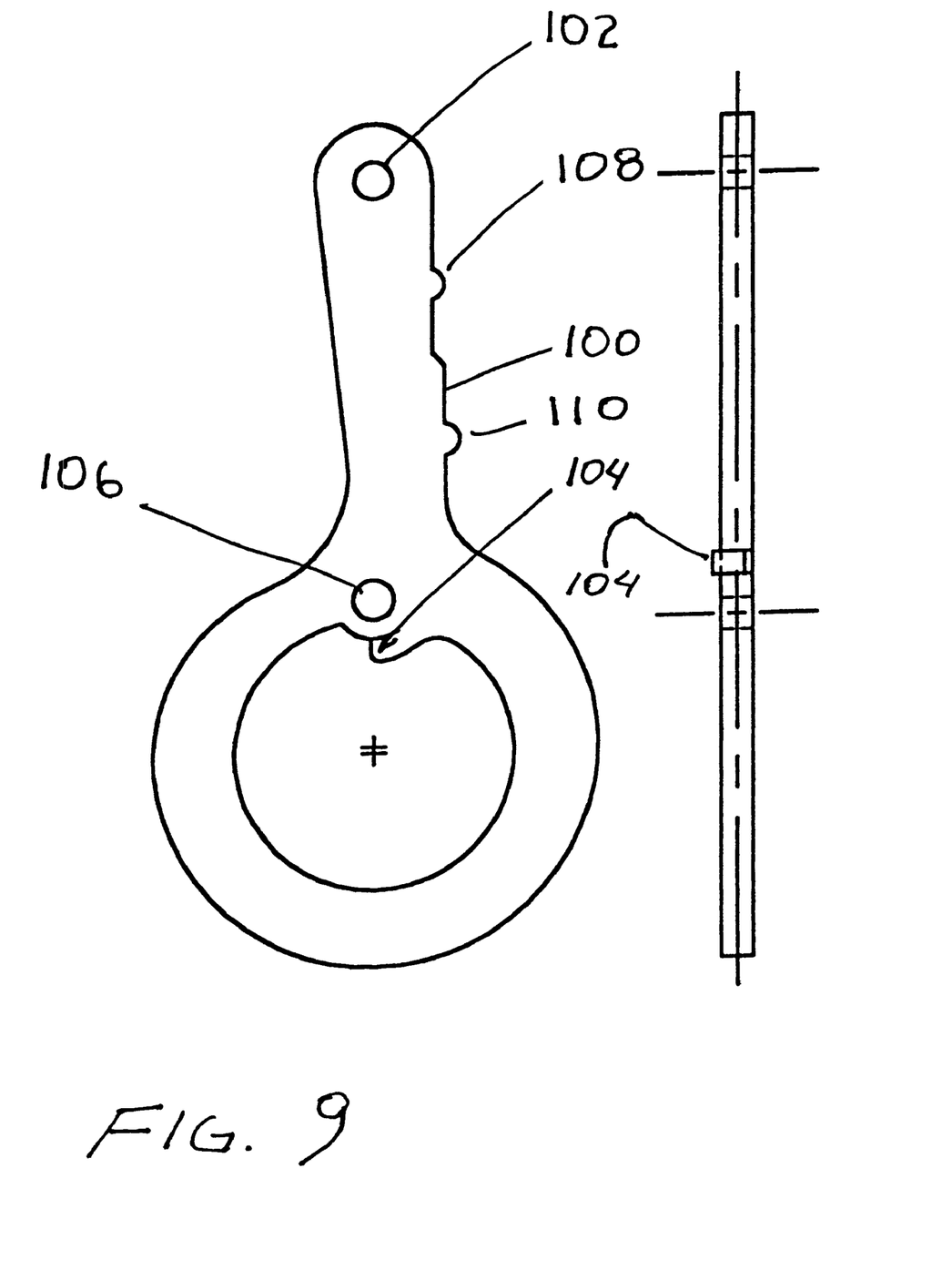
FIG. 9 shows the permanent anchorage connector side plate.
Figure 10:
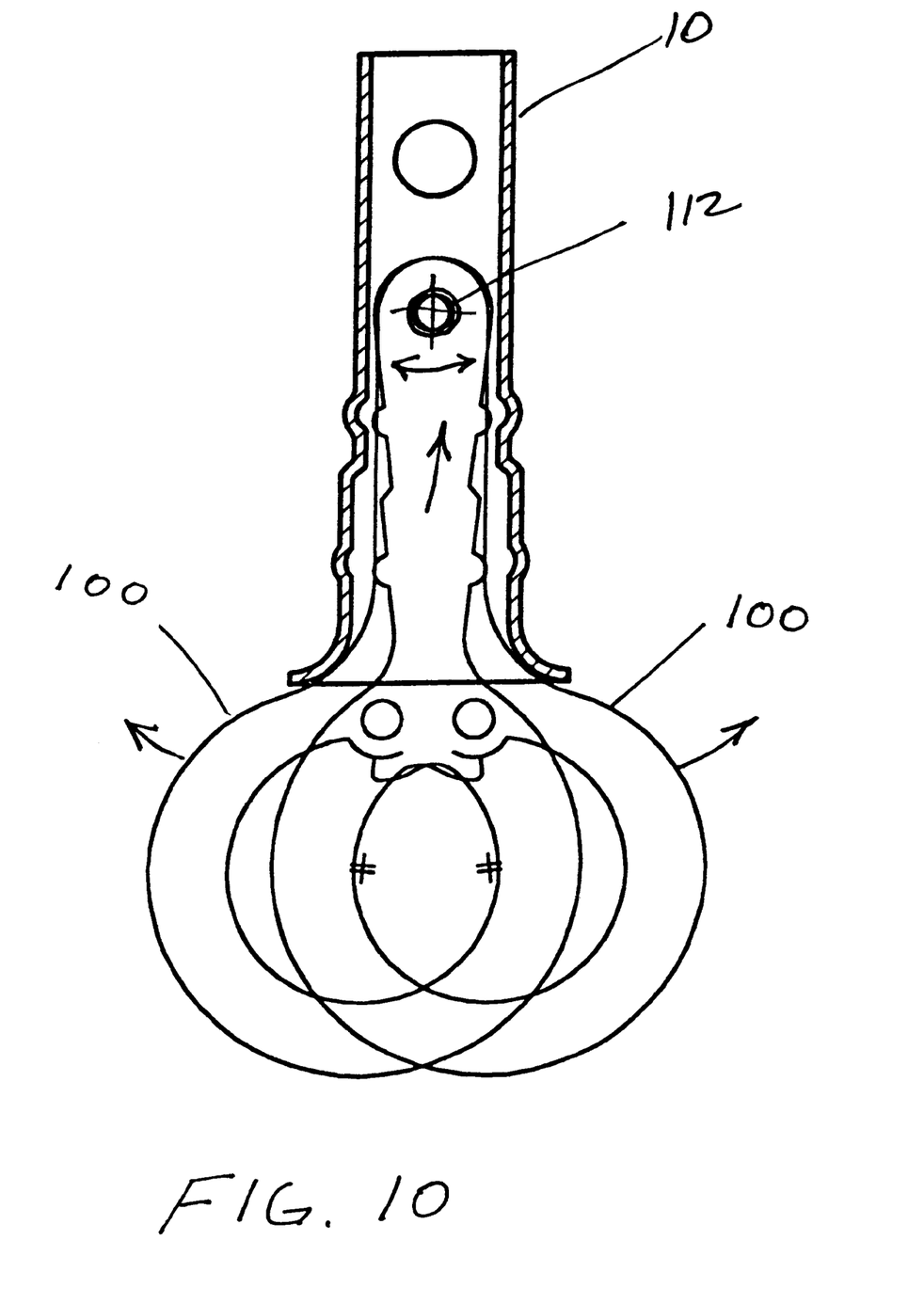
FIG. 10 shows the permanent anchorage connector during installation.
Figure 11:
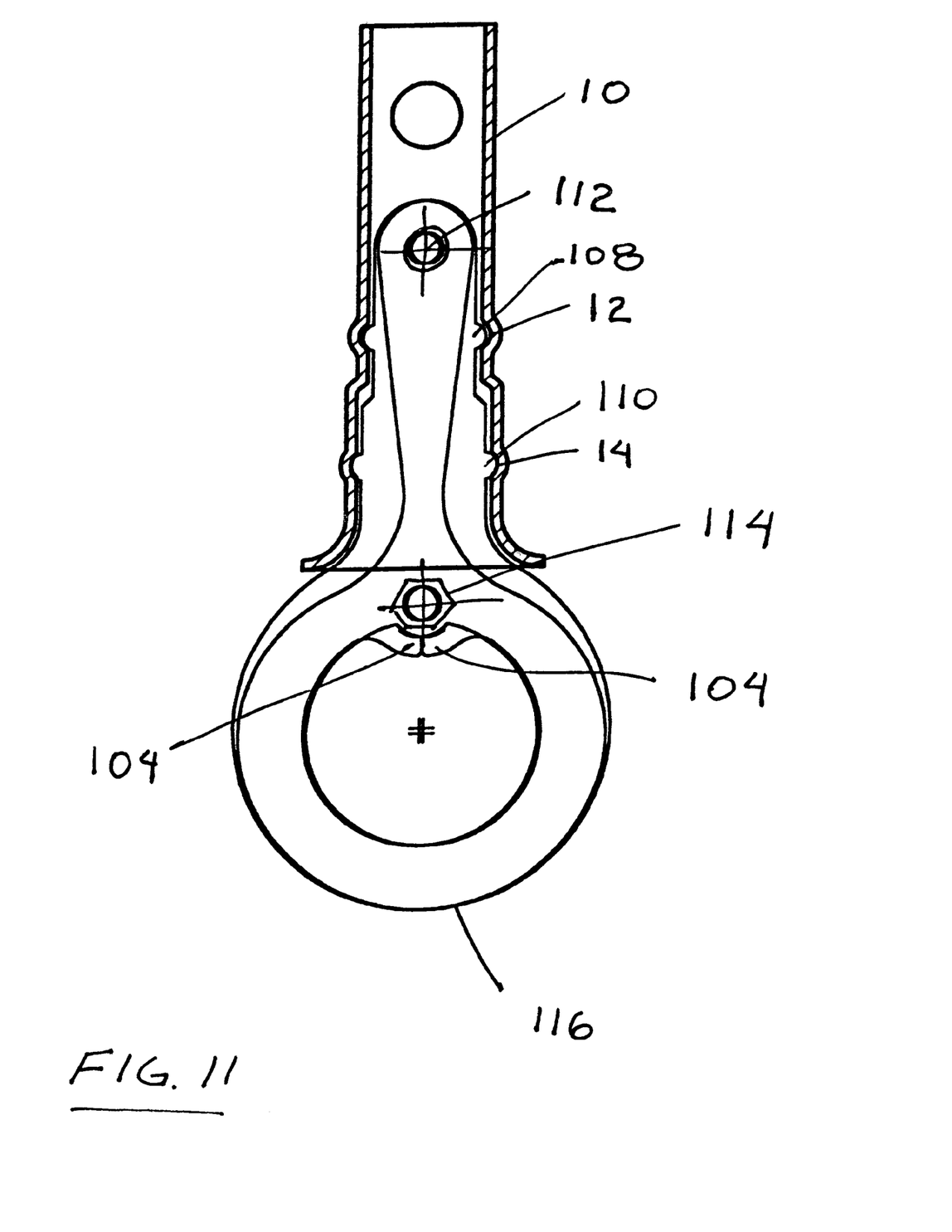
FIG. 11 shows the permanent anchorage connector after installation.

FIG. 9 shows a permanent anchorage connector side plate used in pairs and riveted together at the top pivot-hole location (102). Each side plate has one locking tab (104) that snaps to lock the two side plates together prior to inserting the bolt in the lower bolt hole (106). The locking ball surfaces are modeled with the profile features (108) and (110). FIG. 10 shows the permanent anchorage connector during installation. Each identical side plate is riveted together by the rivet (112) so that it can pivot about the rivet axis to allow the balls to disappear under the mating side allowing sufficient clearance for the permanent anchorage connector to be inserted into the receiver (10). FIG. 11 shows the permanent anchorage connector after installation into the receiver and locked into place. The upper ball profile (108) of each side plate is locked into the upper ball groove (12). The lower ball profile (110) of each side plate is locked into the lower ball groove (14) of the receiver (10). The locking tab profile (104) in each side plate has passed over each other during the locking process and snapped into place, resisting removal of the permanent anchor unless the plates are spread apart. Once the permanent anchor is secures in place a locking bolt is inserted in the locking bolt hole (106) and tightened with a wrench to secure the anchorage connector assembly (116).

Figure 12:
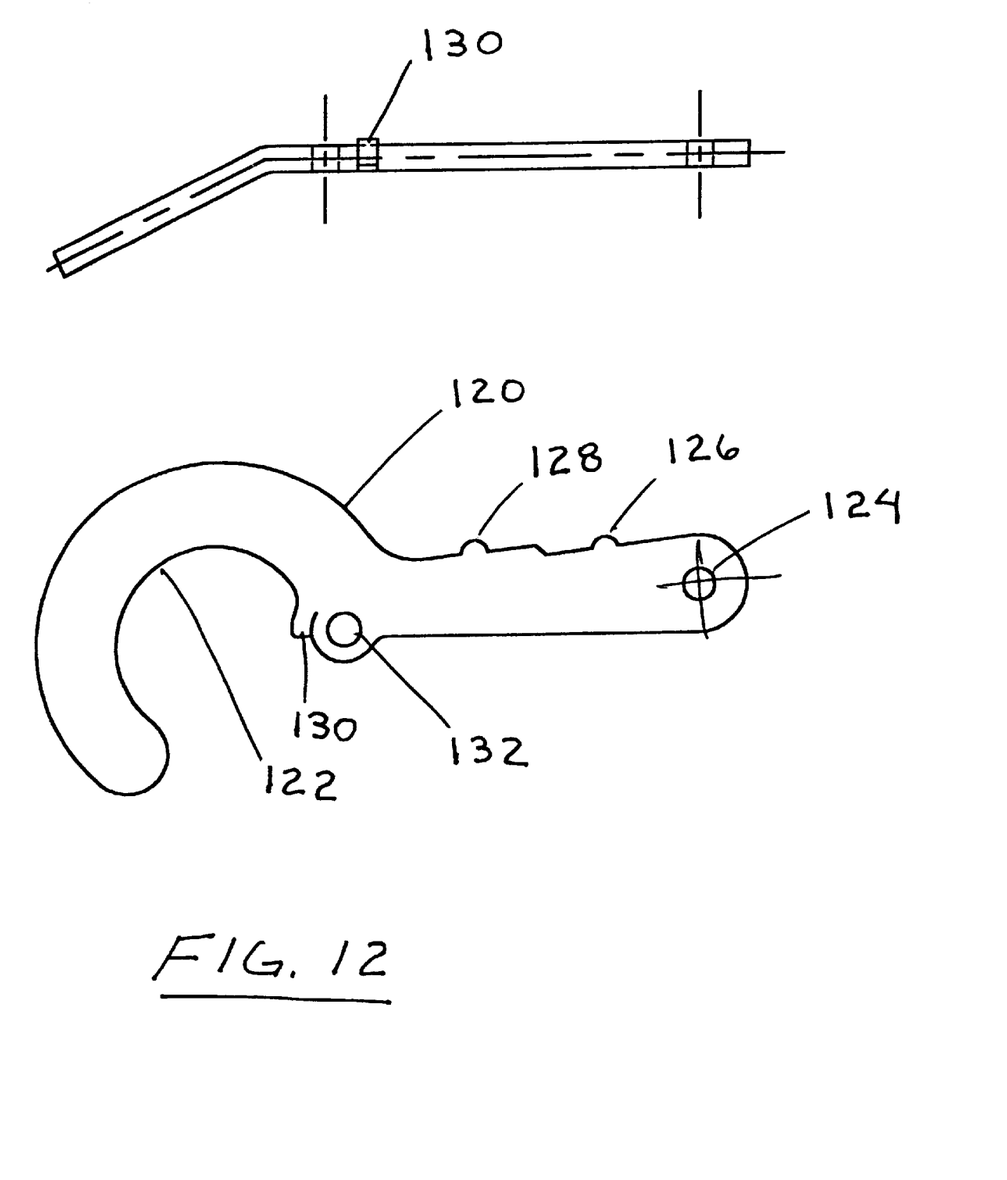
FIG. 12 shows the permanent bypass anchorage connector side plate.

FIG. 12 shows the permanent bypass anchorage connector side plate (120). This side plate is used as a bypass for a horizontal lifeline and therefore uses two open hooks (122) to form a pass through eye which can be used to manually manipulate a locking snap through without disconnecting it from a horizontal lifeline cable (142). The horizontal lifeline bale (142) is installed to pass through the eye formed by the 2 open hooks. This bypass anchorage connector is installed the same as the permanent anchorage connector assembly (116) and possesses the same features, the top pivotal hole (124), the upper ball profile (126), the lower ball profile (128), the locking tab (130), and the lower bolt hole (132).

Figure 13:
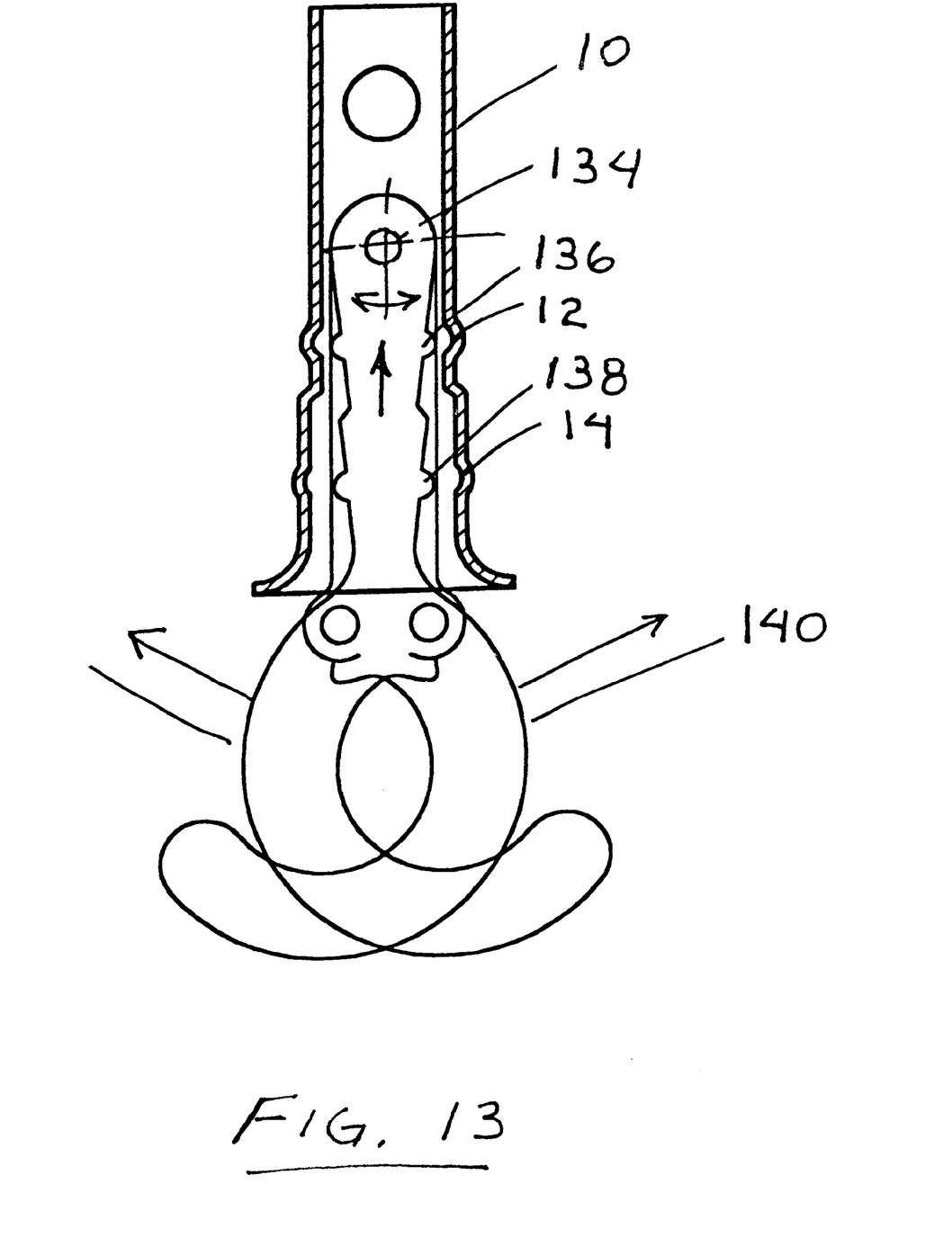
FIG. 13 shows the permanent bypass anchorage connector during installation.
Figure 14:
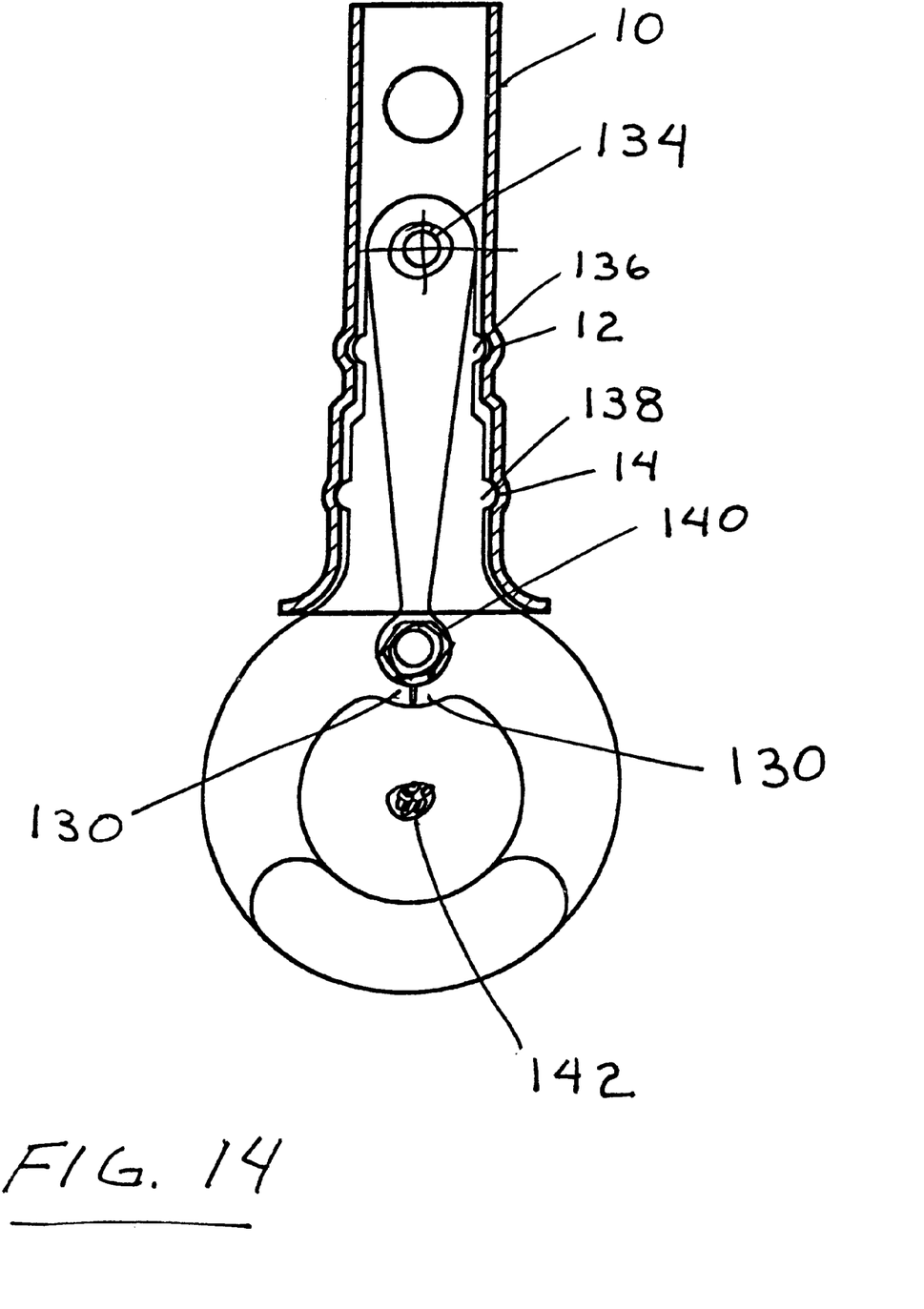
FIG. 14 shows the permanent bypass anchorage connector after installation.

FIG. 13 shows the permanent bypass anchorage connector during installation into the receiver (10). The rivet (134) allows the plates to rotate together so that the assembly can be inserted into the receiver (10). The upper ball profile (136) locks into the upper ball groove (12) and the lower ball profile (138) locks into the lower ball groove (14). Once inserted the bypass side plates (140) are pulled outward until the balls engage the ball grooves and the connector is locked into place by the locking tabs (130).

The permanent anchorage connectors use parallel steel sliding plates with the ball groove profile formed into the outer surface to create the same effect as 4 locking balls but at a far lower cost than the portable ball-lock anchorage connector.

Thus, FIGS. 1–14 illustrate an anchorage device 200 that includes a receiver 202 that includes a body 204 having an aperture 206 that extends along an axis 208. The aperture 206 includes a first section 209 of a first size 210 and a second section 212 of a second size 214. The second size 214 is smaller than the first size 210. Additionally, the first section 208 includes a first retaining recess 216, and the second section 212 includes a second retaining recess 218.

The aperture 206 accepts a male connector 220. As illustrated in FIGS. 1–14, the male connector 220 includes a body 222 along an axis 229. The body 222 includes a leading end 224 and a trailing end 226 that extend along the axis 224. The leading end 224 is of a leading size 228, the leading size 228 being approximately equal to the second size 214. Similarly, trailing end 226 is of a trailing size 230, and the trailing size 230 is approximately equal to the first size 210. Additionally, the male connector 220 includes a leading retractable retaining mechanism 232 located in the leading end 224 of the male connector 220 and a trailing retractable retaining mechanism 234, located in the trailing end 226 of the male connector 220. As illustrated in FIGS. 4 and 11, the leading retractable mechanism 232 has been adapted for engaging the second retaining recess 218 the trailing retractable mechanism has been adapted for engaging the first retaining recess 216, so that engagement of the trailing retractable mechanism 234 against the first retaining recess 216 occurs once the leading retractable retaining mechanism 232 engages the second retaining recess 218.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. An anchorage device comprising:

A receiver having a body having an aperture along an axis, the aperture having a first section of a first size and a second section of a second size, the second size being smaller than the first size, the first section having a first retaining recess, and the second section having a second retaining recess;

A male connector adapted for insertion into the aperture of the receiver, the male connector having a body along an axis, the body having a leading end and a trailing end extending along the axis, the leading end being of a leading size, the leading size being approximately equal to the second size, the trailing end being of a trailing size, the trailing size being approximately equal to the first size, the male connector further comprising a leading retractable retaining mechanism located in the leading end of the male connector and a trailing retractable retaining mechanism located in the trailing end of the male connector, the leading retractable mechanism being adapted for engaging the second retaining recess the trailing retractable mechanism being adapted for engaging the first retaining recess, so that engagement of the trailing retractable mechanism against the first retaining recess occurs once the leading retractable retaining mechanism engages the second retaining recess.

2. An anchorage device according to claim 1 wherein said leading retractable retaining mechanism and said trailing retractable mechanism comprise a ball and plunger mechanism.

3. An anchorage device according to claim 2 wherein said leading retractable retaining mechanism and said trailing retractable mechanism comprise a pair of ball and plunger mechanisms that are connected to one another in series.

4. An anchorage mechanism according to claim 1 wherein said leading retractable retaining mechanism and said trailing retractable mechanism are housed within said male connector.

5. An anchorage mechanism according to claim 4 wherein said leading retractable retaining mechanism and said trailing retractable mechanism comprise a ball and plunger mechanism.

6. An anchorage device comprising:

A receiver having a body having an aperture along an axis, the aperture having a first section of a first size and a second section of a second size, the second size being smaller than the first size, the first section having a first retaining recess, and the second section having a second retaining recess;

A male connector adapted for insertion into the aperture of the receiver, the male connector having a body along an axis, the body having a leading end and a trailing end extending along the axis, the leading end being of a leading size, the trailing end being of a trailing size, the male connector further comprising a leading retractable retaining mechanism located in the leading end of the male connector and a trailing retractable retaining mechanism located in the trailing end of the male connector, the leading retractable mechanism pivoting about the leading end and being adapted for engaging the second retaining recess the trailing retractable mechanism pivoting about the leading end and being adapted for engaging the first retaining recess, so that engagement of the trailing retractable mechanism against the first retaining recess occurs once the leading retractable retaining mechanism engages the second retaining recess.

7. An anchorage device according to claim 6 wherein said leading retractable retaining mechanism and said trailing retractable mechanism are mounted on pivotally connected plates.

8. An anchorage device according to claim 7 wherein said leading retractable retaining mechanism and said trailing retractable mechanism further comprises ball profiles of unitary construction with the pivotally connected plates.

9. A method for creating an anchorage having at least two parallel support areas along a support axis, the method comprising:

Providing:

a receiver having a body having an aperture along an axis, the aperture having a first section of a first size and a second section of a second size, the second size being smaller than the first size, the first section having a first retaining recess, and the second section having a second retaining recess; and     A male connector adapted for insertion into the aperture of the receiver, the male connector having a body along an axis, the body having a leading end and a trailing end extending along the axis, the leading end being of a leading size, the leading size being approximately equal to the second size, the trailing end being of a trailing size, the trailing size being approximately equal to the first size, the male connector further comprising a leading retractable retaining mechanism located in the leading end of the male connector and a trailing retractable retaining mechanism located in the trailing end of the male connector, the leading retractable mechanism being adapted for engaging the second retaining recess the trailing retractable mechanism being adapted for engaging the first retaining recess;

Engaging the leading retractable retaining mechanism against the second retaining recess, and then engaging trailing retractable mechanism against the first retaining recess, so that the leading retractable mechanism and the trailing retractable mechanism cooperate with the receiver to resist a force along the axis of the body of the receiver.

\* \* \* \* \*